Dec. 3, 1929.   A. H. MAGGS   1,738,441
DYNAMO ELECTRIC MACHINE
Filed March 23, 1928   2 Sheets-Sheet 1

Inventor:
Arthur H. Maggs
by Charles E. Tullar
His Attorney

Dec. 3, 1929.  A. H. MAGGS  1,738,441
DYNAMO ELECTRIC MACHINE
Filed March 23, 1928  2 Sheets-Sheet 2

Inventor:
Arthur H. Maggs,
by Charles E. Mullar
His Attorney.

Patented Dec. 3, 1929

1,738,441

UNITED STATES PATENT OFFICE

ARTHUR H. MAGGS, OF KEYNSHAM, NEAR BRISTOL, ENGLAND, ASSIGNOR TO GENERAL ELECTRIC COMPANY, A CORPORATION OF NEW YORK

DYNAMO-ELECTRIC MACHINE

Application filed March 23, 1928, Serial No. 264,159, and in Great Britain May 11, 1927.

This invention relates to commutator dynamo electric machines and more particularly to the type of machine known as a compensated induction motor. In the types of these machines which have their primary windings on the rotor it is not desirable to have a voltage on the slip rings in excess of from 600 to 700 volts and where such machines are to be used on a circuit of higher voltage say 2000 to 3000 volts, a construction differing from that mentioned above is desirable.

The object of the present invention is to provide a motor of the above type which will be suitable for high voltage circuits and to that end it consists in providing the primary and compensating windings on the stator of the machine, while the secondary winding is on the rotor.

This construction involves the use of a fixed commutator and rotating brush gear, which hitherto have not been considered practical.

This invention therefore further consists in providing a suitable commutator and brush gear. The commutator is so equalized that the number of segments is reduced to such a number that they may be replaced by brushes and the rotating brush gear is replaced by an equivalent collecting device.

Figure 1:
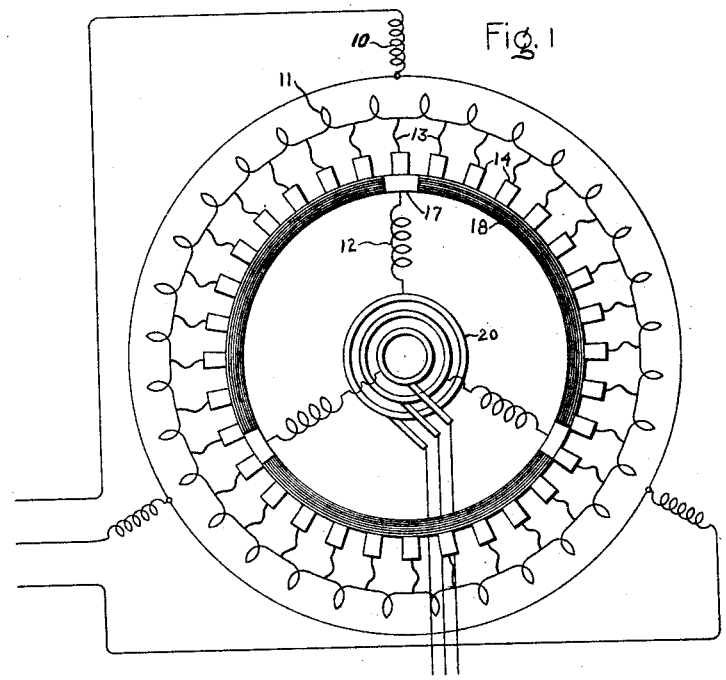
Figure 2:
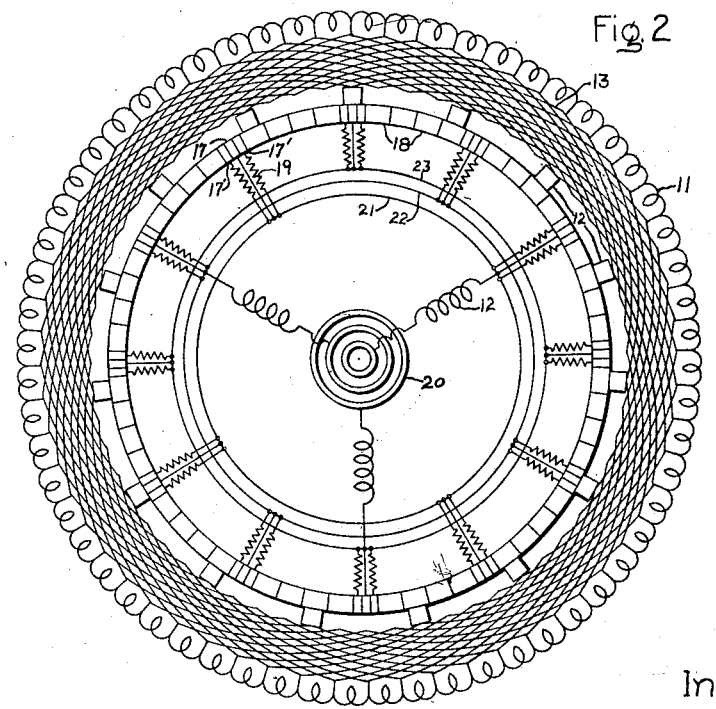
Figure 3:
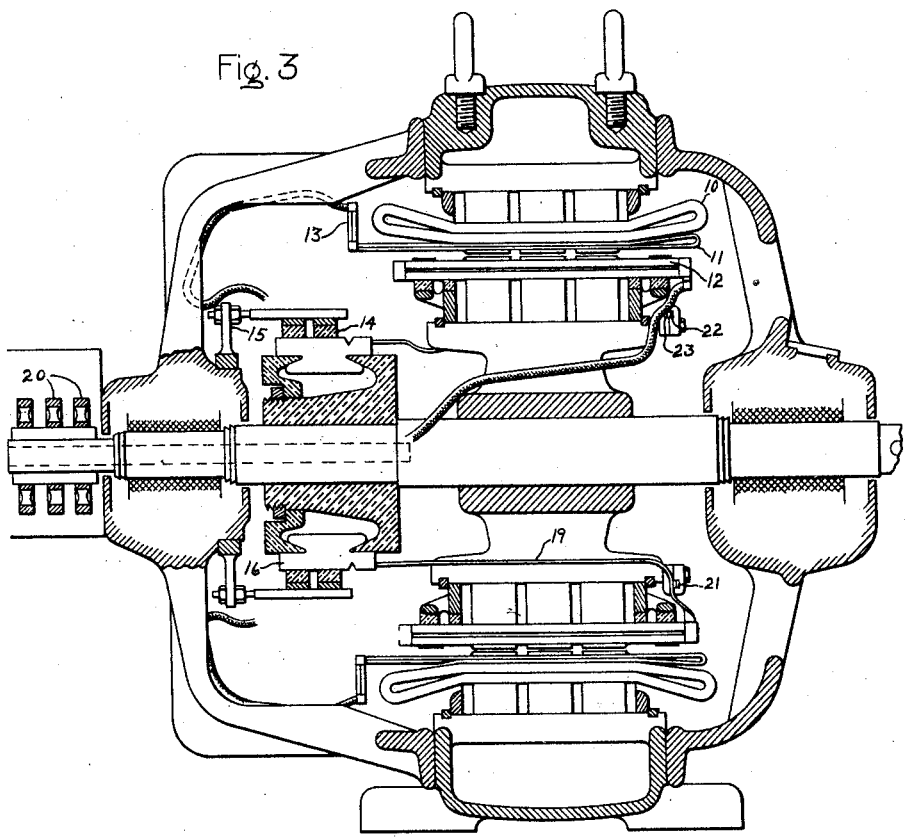

The features of the invention which are believed to be novel and patentable will be pointed out in the claims appended hereto. For a better understanding of the invention reference will be made in the following description to the accompanying drawings which illustrate the essential features of the invention and in which Fig. 1 is a diagrammatic representation of a 2-pole machine; Fig. 2 represents a practical arrangement of the connections between the conpensating winding and secondary winding of an 8-pole machine, and Fig. 3 represents a cross-section through a machine in which the invention has been applied to illustrate one physical arrangement of the essential parts.

Referring to the drawings a machine constructed according to this invention is provided with a primary winding 10 and usually a separate compensating winding 11 on the stator, and a secondary winding 12 on the rotor. The compensating winding which may be similar to an ordinary type of direct current armature winding, is connected to an adjustably fixed commutator preferably through high resistance connectors 13. This commutator consists of brushes 14 of any ordinary type, which constitute the segments, and which are all carried by one brush rocker 15 (see Fig. 3), adjustable to any desired position relative to the stator windings. The brushes bear on a collecting device 16 similar to an ordinary commutator which is mounted on the rotor.

This collecting device may consist of a drum built up of metallic segments 17, insulated from each other, a certain number only of which are used to carry current and are referred to hereinafter as collector bars, the remaining segments 18 being used to form a continuous bearing surface for the brushes. In Fig. 1 the inactive segments are represented as insulation and in Fig. 2 as ordinary segments.

The collector bars are each connected either directly as in Fig. 1, or indirectly through a high resistance connector as at 19 in Fig. 2, to one end of a secondary phase, the other end of which is connected to a slip ring 20, so that external resistance can be introduced into the secondary circuit for starting or speed regulating purposes in the same way as an ordinary induction motor. Each collector bar may consist of several bars insulated from one another as represented in Fig. 2 at 17' 17 and 17', each individual bar being connected to one bus ring say 21, belonging to one secondary phase, either directly as in the case of the middle bar 17 or through a high resistance connector 19 as in the case of the outside bars 17'. This graduated resistance connection is helpful to commutation. When the primary winding is supplied from a suitable alternating current source of power, the flux which rotates at synchronous speed relatively to the primary winding induces in the compensating winding 11 an electromotive force of constant value. The frequency at the collector bars of this constant electromotive force depends on the speed of the motor, and is the same as the frequency with which the flux revolves relatively to the secondary winding 12. Thus for a given position of the brushes 14 the phase relationship between the electromotive force at the collector bars, and that induced in the secondary winding is constant. By suitably setting the brushes the power factor of the primary current can be adjusted to any desired value, within limits, for a given load.

In the case of a multi-polar machine the number of collector bars is equal to the product of the number of pairs of poles and the number of secondary phases. Thus Fig. 2 represents an 8-pole 3 phase machine. The collector bars are connected to a number of bus rings 21, 22, 23 equal to the number of secondary phases, and each of the bus rings is connected to one end of a secondary phase, the other ends being connected to slip rings 20 for the purpose of introducing resistance into the secondary. It is not necessary to have the same number of slip rings as of secondary phases, as in any case a short circuiting device may be provided to short-circuit the ends of the secondary phases. The collector bars of one phase are equally spaced two pole pitches apart around the rotor and are connected to one bus ring either directly or through high resistance connectors. The total number of brushes will preferably be the same as, but may be a multiple of, the number of segments per pole pair of the equivalent fixed commutator, as it is neither necessary nor desirable to use a number corresponding to the full number of segments since ordinary equalizer connections may be employed.

In construction, the primary winding may be placed in the upper portion of the stator slots and the compensating winding in the lower portion near the opening as represented in Fig. 3. The secondary winding may occupy the whole of the rotor slots, and may be connected to the slip rings 20 and to the bus rings 21, 22, 23 from which the leads which may be of high resistance material are taken to the collector bars. If desired, the relative positions in the slots of the primary and compensating windings may be reversed. The compensating winding may be of any suitable type and under suitable conditions may be combined with the primary winding.

A motor constructed as above described is suitable for any of the usual voltages for which induction motors are usually used, and also for greater outputs and larger sizes than those at present designed.

A further advantage is that as electrically consecutive brushes need not be adjacent to one another in multipolar motors, and also as high resistance connectors can be utilized between the collector bars and the bus rings, the compensating windings can be designed for high voltages between the brushes, because it is not possible for mechanically adjacent brushes to be short-circuited by one collector bar and also because a short-circuit path between two electrically consecutive brushes consists of two sets of high resistance connectors in series which can be designed to effectively prevent a deleterious short-circuit current.

What I claim as new and desire to secure by Letters Patent of the United States is:

1. A compensated induction machine comprising a primary stator winding member, and a secondary rotor winding member, a secondary winding on the rotor member, a distributed winding on the primary member and commutator means connected between said stator and rotor windings whereby phase compensating currents may be conveyed to the secondary winding from the winding on the stator, said commutating means comprising a plurality of brushes corresponding to the segments of the commutator in that they are connected to the winding on the primary member as the segments of a commutator are connected to a commutated winding, and a rotary commutator member upon which said brushes bear, said member having spaced conducting segments connected to the secondary winding, the spacing of said conducting segments corresponding to the phase and pole spacing of the secondary winding parts to which they are connected.

2. A polyphase induction machine having a primary stator winding, a compensating stator winding and a secondary rotor winding, a plurality of adjustable brushes connected to said compensating winding, a commutator on the rotor on which said brushes bear, said commutator having spaced segments connected to corresponding phases of the secondary winding, each segment being divided into a plurality of insulated sections connected to the same secondary phase through leads having graduated resistances such that the resistance of the connection between the compensated winding and secondary winding is a maximum as a brush moves on and off a segment.

In witness whereof, I have hereunto set my hand this 28th day of February, 1928.

ARTHUR H. MAGGS